Jan. 6, 1925.　　　　E. P. HERRMANN　　　　1,521,768
PAPER SPOON
Filed March 6, 1923

Inventor
Edmund Paul Herrmann,
By B. Singer
Attorney

Patented Jan. 6, 1925.

1,521,768

UNITED STATES PATENT OFFICE.

EDMUND PAUL HERRMANN, OF NEWARK, NEW JERSEY, ASSIGNOR TO MONO-SERVICE COMPANY, OF NEWARK, NEW JERSEY, A CORPORATION OF NEW JERSEY.

PAPER SPOON.

Application filed March 6, 1923. Serial No. 623,269.

*To all whom it may concern:*

Be it known that I, EDMUND PAUL HERRMANN, a citizen of the United States, residing in the city of Newark, county of Essex, State of New Jersey, have invented a new and useful Paper Spoon, of which the following is a specification.

This invention is an improved paper utensil, such as a spoon, the object of the invention being to provide an improved utensil of this kind which may be readily manufactured at exceeding small cost, which is initially in the form of a flat extended blank which occupies but very slight space and which can be readily and instantly folded into condition for use, as hereinafter described and claimed.

In the accompanying drawings:—

Figure 1:
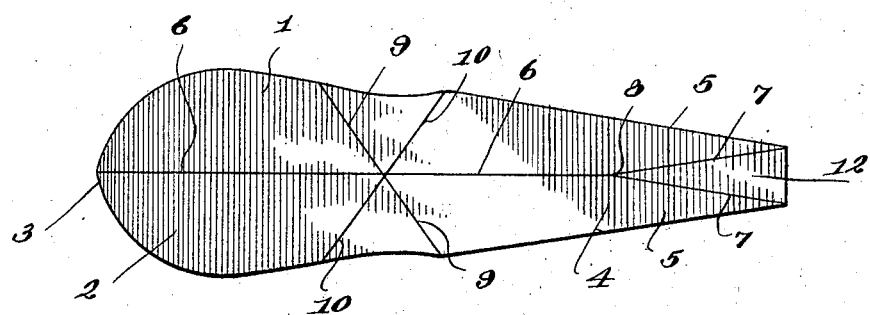
Fig. 1 is a plan of a paper spoon in the form of a flat extended blank as constructed in accordance with my invention.

In accordance with my invention, the utensil, such as a spoon 1, is made of paper and is initially in the form of a flat, extended blank, as shown in Fig. 1, the bowl portion 2 having a rounded point or outline 3, and the handle portion 4 having rearwardly converging side edges 5.

The blank is cut or stamped from a paper sheet by suitable machinery, and is also provided with a centrally arranged longitudinal crease 6 which extends from the point of the bowl to within a suitable distance of the rear end of the handle. It is also provided with forwardly converging creases 7 which extend from the rear corners of the handle to the crease 6, as at 8. That portion of the blank which is intermediate the bowl and the handle is provided with intersecting creases 9, 10, which also intersect the crease 6.

Figure 2:
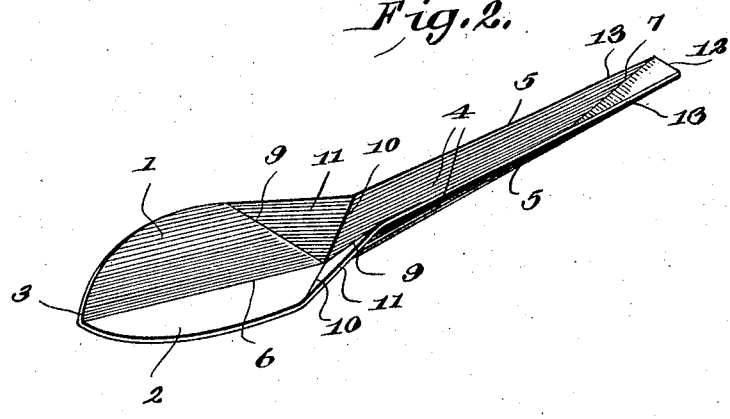
Fig. 2 is a perspective view of the spoon when folded and arranged in condition for use.

The spoon is foldable longitudinally on the crease 6 and also on the creases 7, 9 and 10, as shown in Fig. 2 and when thus folded is in condition for use. The creases 9, 10 define triangular portions 11 which connect the bowl with the handle and also form the base or inner end of the bowl, and the forwardly converging creases 7 in the handle define a triangular portion 12 which spaces the rear ends of the sides 13 of the handle apart, causes the handle of the spoon to approximate the conventional form, and also greatly strengthens the handle.

While I have herein shown and described a preferred form of my invention, I would have it understood that changes may be made within the scope of my invention as defined in the appended claims.

What I claim is:—

1. A paper utensil such as a spoon, comprising a bowl portion and a handle portion, and having a crease extending from the point of the bowl portion to a point spaced from the rear end of the handle portion and on which said utensil is foldable, and means coacting with said crease defining the bowl portion and the handle portion when folded.

2. A paper utensil such as a spoon, comprising a bowl portion and a handle portion, and having a crease extending from the point of the bowl portion to a point spaced from the rear end of the handle portion and also having rearwardly diverging creases in the rear end of the handle portion, extending from the first named crease, and angularly related creases converging to said first named crease and defining triangular portions between the spoon and the inner end of the handle.

In witness whereof I affix my signature.

EDMUND PAUL HERRMANN.